3,354,155
AMINOALKYLPHOSPHONIUM COMPOUNDS AND
PROCESS FOR THE USE THEREOF
James R. Tretter, East Lyme, Conn., assignor to Chas. Pfizer & Co., Inc., New York, N.Y., a corporation of Delaware
No Drawing. Filed Oct. 12, 1964, Ser. No. 403,326
4 Claims. (Cl. 260—240)

ABSTRACT OF THE DISCLOSURE

Preparation of aminoalkyl tri-substituted phosphonium compounds, use of the latter in the preparation of aminopropylidene tri-substituted-phosphoranes and reaction of the latter with ketones in the production of aminopropylidene-dibenzoxepines and other compounds useful, inter alia, as psychotherapeutic agents. Recovery of pure cis 11-(3 - dimethylaminopropylidene)-6,11-dihydrodibenz (b,e) oxepine from admixture with its trans isomer is also described.

*Cross reference to related application*

This application is a continuation-in-part of application Ser. No. 316,141 filed Oct. 14, 1963, and now abandoned.

This invention relates to new and novel organic compounds and to their use in the synthesis of valuable chemicals, for example, drugs. More particularly, it is concerned with aminoalkyl tri-substituted-phosphonium compounds, with aminopropylidene tri-substituted-phosphoranes and with processes for their use in the preparation of valuable aminopropylidene-substituted compounds. Such processes comprise the reaction of the new compounds of this invention with ketones.

The new aminoalkyl tri-substituted-phosphonium compounds contemplated by the instant invention are selected from the group consisting of those of the formula:

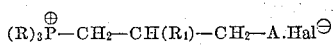

wherein:

R is selected from the group consisting of alkyl of up to about 6 carbon atoms, phenyl, aminophenyl and benzyl;
Hal is halogen;
$R_1$ is selected from the group consisting of hydrogen and alkyl of up to about 4 carbon atoms;
A is selected from the group consisting of amino, monoalkylamino, dialkylamino, piperidino, morpholino, piperazinyl, 4 - alkylpiperazinyl, 4 - hydroxyalkylpiperazinyl, 4-alkoxyalkylpiperazinyl, 4-aryloxyalkylpiperazinyl, 4-hydroxyalkyloxyalkylpiperazinyl, 4-alkylsulfonylpiperazinyl, 4-dialkylsulfamylpiperazinyl, mono - lower alkenylamino, mono-lower cycloalkylamino, said alkyl, said lower alkenyl and said cycloalkyl groups containing up to about 4 carbon atoms, said aryl groups containing up to about 6 carbon atoms, and salts of the said compounds.

Particular mention is made of aminoalkyl triphenylphosphonium compounds of the formula:

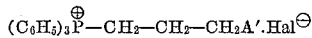

wherein Hal is as aforesaid and A' is selected from the group consisting of amino, monoalkylamino, dialkylamino, piperidino, morpholino, piperazinyl, and 4-alkylpiperazinyl, said alkyl groups containing up to about 4 carbon atoms, and salts of said compounds.

Special mention is made of two particularly valuable compounds in this series: 3-dimethylaminopropyl triphenylphosphonium bromide hydrobromide and 3 - (1-piperazinopropyl)triphenylphosphonium bromide hydrobromide.

In addition, the instant invention contemplates tri-substituted phosphene aminopropylidene phosphorane compounds of the formula:

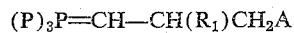

wherein R, $R_1$ and A have the meanings designated hereinbefore.

An especially valuable series of compounds is designated by the formula:

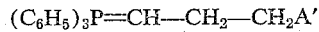

wherein A' has the meaning designated hereinbefore.

Particular mention is made of two compounds of the series which are particularly valuable for the purposes of preparing psychotherapeutic agents: (3 - dimethylaminopropylidene - 1)triphenylphosphorane and [3 - (1-piperazino)-propylidene-1]triphenylphosphorane.

The instant invention, in addition, contemplates processes for the use of valuable new compounds in the preparation of aminopropylidene-substituted compounds. Said organic compounds possess the following structure:

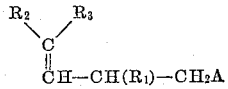

wherein:

$R_1$ and A have the meanings set forth hereinabove, and
$R_2$ and $R_3$, separately, are each alkyl of up to 4 carbon atoms and wherein $R_2$ and $R_3$, taken together with the carbon atom to which they are joined, form part of a ring system of from 3 to 7 members.

As is well known, many aminopropylidene-substituted compounds are valuable as psychotherapeutic agents. The said psychotherapeutic agents are used in the chemotherapy of mental diseases and especially for the treatment of depressed or excited states. Some of them are valuable in that they have potent antiemetic properties. Certain of the agents which can be prepared employing the valuable processes of the instant invention are also of use as regulators of the autonomic nervous system and they may exhibit antiserotonin, antihistaminic and anticholinergic activity; they may also be appetite stimulants. The said psychotherapeutic agents are well known to those skilled in the art to which this invention pertains; some of them are the subject of copending patent applications; for example, novel aminopropylidene dibenzoxepins are disclosed and claimed in the copending application of Barry M. Bloom and James R. Tretter, Ser. No. 245,643, filed Dec. 19, 1962, and aminopropylidene thioxanthenesulfonamides are disclosed and claimed in the copending application of Barry M. Bloom and James F. Muren, Ser. No. 276,081, filed Apr. 26, 1963, now U.S. Patent 3,310,553, both of which said applications have been assigned to the assignee of the instant application. The novel processes of the instant invention are particularly useful in the preparation of the compounds disclosed in the said copending applications.

Of course, as is obvious, the aminopropylidine compounds have especially wide utility in that they can be converted to many useful derivatives by, for example, subsequent treatment of an unsubstituted nitrogen atom in the piperazine ring. By these subsequent reactions can be obtained aminopropylidene-substituted compounds of the above formula wherein the amino group is additionally, 4-acyloxyalkylpiperazinyl, 4-monoalkylcarbamylpiperazinyl, 4 - dialkylcarbamylpiperazinyl, 4 - acylalkylpiperazinyl, 4-aroylalkylpiperazinyl, 4-carboalkoxypiperazinyl, 4 - carbamylpiperazinyl, 4 - monoalkylcarbamylpiperazinyl, 4 - dialkylpiperazinyl, 4 - acylpiperazinyl, 4-aroylpiperazinyl, and the like.

One process contemplated by the instant invention comprises the preparation of a compound of the formula:

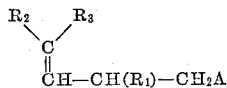

by causing a phosphorane of the formula:

$$(R)_3P=CH-CH(R_1)CH_2A$$

to react with a ketone of the formula:

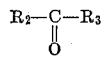

wherein R, $R_1$, $R_2$, $R_3$ and A are as hereinbefore defined.

A particular embodiment of the process of the instant invention is represented in the following sequence:

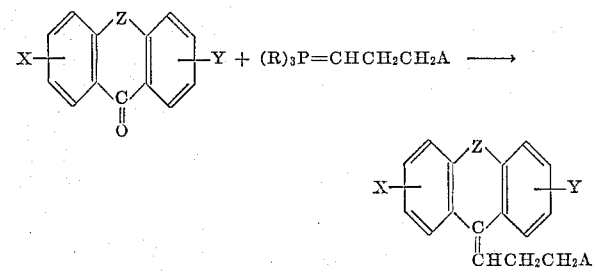

wherein Z is, for example, —O—, S—, —$CH_2CH_2$—, —CH=CH—, —$CH_2O$—, $CH_2$—S—, —NH— —N($CH_3$)—$CH_2$— and the like, R and A are as hereinbefore defined and X and Y comprise, for example, hydrogen, alkyl, aryl, halogen, hydroxyl, sulfonamido, alkoxyl, trihalomethyl, aryloxyl, and the like.

As will be exemplified in detail hereinafter, the process is carried out by causing the alkylaminopropylidene tri-substituted-phosphorane contemplated by the instant invention to be reacted with the desired ketone and, after allowing the reaction to continue for a period of time at an appropriate temperature, for example, from about —10° C. to about 100° C. depending on the reactivity of the ketone, the product can be isolated by removing the solvent such as, for example, by distillation in a vacuum.

The product can be purified by recrystallization and may be converted, if desired, to pharmaceutical dosage forms.

Also contemplated by the instant invention is a process for the preparation of the aminopropylidene tri-substituted-phosphoranes from novel starting materials, tri-substituted aminoalkylphosphonium salts. This is, in essence: A process for the preparation of an aminopropylidene-tri-substituted-phosphorane of the formula:

$$(R)_3P=CH-CH(R_1)-CH_2A$$

wherein R, $R_1$ and A are as hereinbefore defined which comprises treating a suspension of a tri-substituted aminoalkylphosphonium compound of the formula:

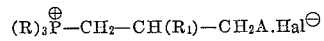

with a strong base. As will be exemplified, the reaction can be carried out in a medium such as dry tetrahydrofuran, which does not react with the reagents or the product. Appropriate strong bases comprise, for example, alkoxides or sodium hydride or organometallic reagents such as butyl lithium, and the like.

Heretofore, it has been proposed to prepare aminopropylidene compounds with psychotherapeutic properties by treatment of a ketone with an aminoalkylmagnesium halide Grignard reagent followed by hydrolysis and dehydration of the carbinol formed thereby. The Grignard technique is disclosed as a method for preparing the propylidene compounds of the said copending applications and is well known in the art as a method for preparing other aminopropylidene compounds. In this connection, U.S. Patents Nos. 2,951,082, 2,996,503, 3,046,-283, 3,047,580 and 3,055,888 show the use of the Grignard reagent. Among the advantages obtained in the process of the instant invention is the preparation of certain aminopropylidene compounds more economically than can be done with the Grignard reagent or where it is not feasible to use the Grignard reagent. For example, as is well known, Grignard reagents are often consumed in side reactions; these side reactions are avoided with the instantly claimed reagents. There is observed a selectivity of this reagent for ketone functions over ester and amide functions; this is greater than that of the Grignard reagent. Furthermore, this reagent allows direct introduction of the group:

$$=CH-CH_2-CH_2-R$$

wherein R is monomethylamino, amino, piperazinyl, etc., which is not possible with the Grignard reagent. A further and most important and unexpected advantage in using the instantly claimed compounds has been to prepare therapeutically-active aminopropylidene compounds and to achieve a substantial degree of stereochemical control of the product. As is disclosed in one of the said copending applications, aminopropylidene-dibenzoxepines exist in two geometrical isomeric forms and one of the two aminopropylidene side chain configurations, cis and trans, is much more active pharmacologically. And, while the reason for this is not clearly understood at this time, it appears that the reagents instantly claimed generate the more active species. On the other hand, the Grignard reaction with the same ketone generates a mixture in which the isomer of lesser activity predominates. Thus, the reaction mixture from the use of the instantly claimed process contains significantly greater activity than the reaction mixture prepared from the Grignard process. Of course, where the ketone used is symmetrical, the products do not exhibit cis/trans configurations when prepared with either reagent. With respect to this effect, particular mention is made of the preparation, by this process, in high yield, of the more active isomer of 11-(3 - dimethylaminopropylidene) - 6,11 - dihydrodibenz (b,e)oxepine, which active isomer is claimed in the said copending application, Ser. No. 245,643. When the Grignard reagent is used, the isomer of lesser activity predominates; when the reagent of the instant invention is used, the more active isomer predominates. In the said copending application the more active isomer is obtained by the classical and difficult fractional crystallization technique from the Grignard mixture; the instant process largely obviates fractional crystallization.

The preparation of the compounds contemplated by the instant invention is exemplified in detail hereinafter. The process involves the technique representable by the following three-step reaction sequence:

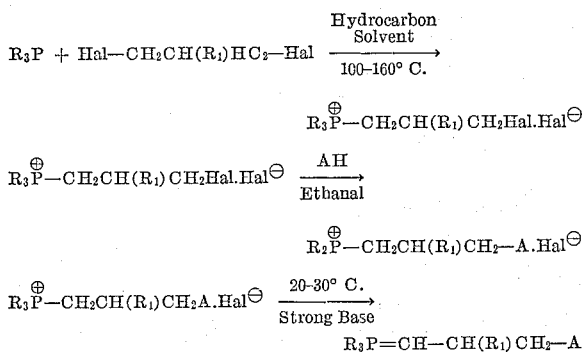

wherein R, $R_1$ and A have the meanings hereinbefore described and Hal represents halogen. The starting materials for this sequence are readily available.

One method for preparing the compounds of the present invention is as follows: In the first step the appropriate-substituted phosphine is treated with a stoichiometrically-equivalent amount of 1,3-dihalopropane, conveniently, dibromopropane, in the presence of a non-reactive organic solvent such as, for example, toluene or xylene. It is especially convenient to use about two volumes of xylene for each volume of the mixed phosphine and dihalopropane. The reaction mixture can be stirred in a nitrogen atmosphere at a reaction temperature above about 100° C., preferably at about 130° C., for a period of about 20 hours. The product may be isolated by cooling the reaction mixture and collecting the 3-bromopropyltriphenylphosphonium bromide as a crystalline product. Alternatively, the reaction mixture may be subjected to a vacuum distillation to remove the solvent and the product remains as a residue.

For the second step in the sequence, the 3-halopropyltriphenylphosphonium halide can be dissolved in about 4 volumes of a polar solvent, for example, methanol or ethanol, and is treated with about 2 equivalents or a slight excess of the appropriate amine. The reaction is completed by warming the mixture to about 70° C., then allowing it to cool to room temperature. After about 20 hours, the volatile components can be removed by distillation in a vacuum, then the residue may be dissolved in about 3 volumes of hot ethanol and treated with gaseous hydrogen halide until the mixture becomes acidic. The product, 3-aminopropyltri-substituted phosphonium halide hydrohalide, is isolated by filtration after concentration of the filtered reaction mixture to about one half of its original volume.

One method of carrying out the process of the present invention is as follows: The instantly claimed aminopropylidene tri-substituted-phosphorane compound is generated in solution by suspending the corresponding tri-substituted 3-aminopropyl phosphonium halide hydrohalide in an anhydrous open chain or cyclic ether, for example, diethyl ether or tetrahydrofuran. Alternatively, solvents such as dimethylsulfoxide may be used. The solution is then treated with a strongly basic reagent at a ratio of 2 moles of said reagent per mole of said phosphonium halide hydrohalide. Among the reagents which may be employed are sodium methoxide, potassium t-butoxide, sodium hydride, butyl lithium, and the like. A particularly useful organometallic reagent is butyl lithium and it is convenient to add this as a heptane solution to the phosphonium halide hydrohalide suspension during about one hour at room temperature. Rather than to isolate the product, which tends to be unstable, it is preferred to use it in the next step in solution by treating said solution with the appropriate ketone; those skilled in the art will recognize that this ordinarily is also done when the Grignard reagent is used.

The next step is carried out by adding about 80% of one stoichiometric equivalent amount of the ketone and allowing the mixture to react for several hours. Depending on the reactivity of the ketone, the reaction rate is controlled by maintaining the mixture at any desired temperature within the range of from about −10° C. to about 100° C. Water, about 10% by volume, is then added and the organic solvent is removed in a vacuum. The residue is treated with a mineral acid until strongly acidic (about pH 2) and there is added an organic solvent which is immiscible with water, preferably benzene. The suspension is stirred, the benzene is separated and the remaining mixture, comprising the product as its soluble or insoluble, depending on the ketone selected, hydrochloride salt and water, is made alkaline with sodium hydroxide solution and the liberated free base is extracted with benzene. The benzene extract is dried and the alkylaminopropylidene product is obtained by evaporation of the benzene. If desired, conversion of the free base into the acid addition salt may be effected.

When appropriate ketones are employed, as is taught in the hereinabove mentioned copending applications and patents and as hereinafter exemplified, compounds prepared by this process and their addition salts with pharmacologically acceptable acids have interesting pharmacodynamic properties, which properties are useful in pharmaceutical compositions.

The salts contemplated by the instant invention comprise generally acid addition salts. For example, the novel compounds form salts with hydrogen halides such as the hydrobromides and hydrochlorides, with sulfuric acid, with phosphoric acid, and the like. In addition, valuable salts are formed with organic acids such as citric, acetic, lactic, maleic, formic, and the like.

As is mentioned above, the instant process provides, predominantly, the more active isomer of 11-(3-dimethylaminopropylidene)-6,11 - dihydrodibenz(b,e)oxepine. As will be exemplified hereinafter, based on the starting ketone, there is obtained a 90% yield of cis/trans isomers in admixture, the ratio of cis to trans being approximately 4:1. However, since largely all of the pharmacological activity resides in the cis isomer, it is desirable to free it of the less active trans isomer. The instant invention, in one of its embodiments, contemplates an improved means to obtain pure cis isomer, substantially free of trans. The instant invention contemplates in a process for recovering pure cis 11-(3-dimethylaminopropylidene)-6,11-dihydrodibenz(b,e)oxepine from an admixture with the trans isomer of said oxepine by fractional crystallization, the improvement which comprises dissolving said admixture in salt form in chloroform and separating the solute of lower solubility.

It has been disclosed previously that fractional crystallization is a useful means to separate the cis and trans isomers of like compounds. However, fractional crystallization is a difficult technique at best, being based on taking advantage of slight differences in solubility of the two or more solutes being separated. It has now been found, unexpectedly, that the cis isomer of the instant oxepine forms, with chloroform, a solute of appreciably less solubility than the trans and advantageously can be recovered very readily, leaving the trans isomer behind in solution. The process is carried out by dissolving in chloroform the cis and trans isomers in admixture in salt form. The nature of the salts is not critical; illustrative of operative acid addition salts are the hydrobromides, hydrochlorides, hydriodides, sulfates, acid sulfates, phosphates, acid phosphates, citrates, acetates, lactates, maleates, formates, and the like. While the reason for the beneficial effect of chloroform is not clearly understood at this time, it is believed to form a complex with the pure cis isomer and the complex itself is believed to be the solute of lower solubility. Separation of the said solute from the solution can be carried out by techniques well within the capability of those skilled in the art of fractional crystallization. For example, the chloroform can be partially concentrated, step-by-step, and crops of crystals removed, the first crops being largely of lower solubility; or the solute can be induced to crystalize at selectively lower temperatures; or a compatible non-solvent can be added, step-by-step, to precipitate the less soluble solute. The instant invention contemplates as an embodiment a process employing a non-solvent, carbon tetrachloride, for recovering the solute of lower solubility, which is rapid and provides cis isomer of very high purity. It is, in essence: In a process for recovering pure cis 11-(3-dimethylaminopropylidene)-6,11-dihydrodibenz(b,e)oxepine from an admixture with the trans isomer of said oxepine by fractional crystallization, the improvement which comprises dissolving said admixture in salt form in chloroform, adding carbon tetrachloride until the solute of lower solubility has been substantially completely precipitated, separating said solute and freeing said solute of chloroform. The amount of carbon tetrachloride to be added will, of course, depend on the amount of chloroform present and the ratio of cis to trans isomers in the admixture. Generally, it has been found that with mixtures of isomers in which are present more than 50% by weight of cis, then a volume of carbon tetrachloride equal to the volume of chloroform is sufficient to precipitate substantially all of the cis isomer. If too much carbon tetrachloride is added, then there will be seen the tendency for some of the trans isomer to be precipitated and, in this event, less should be used. The solute of lesser solubility contains readily removable chloroform, loosely bound. In order to obtain pure cis isomer suitable, for example, for pharmaceutical use, this chloroform should be removed either by recrystallization of the cis isomer from a boiling solvent other than chloroform, for example, ethanol and the like or, alternatively, simply by heating the solute in a vacuum long enough to allow the chloroform to vaporize completely.

The following detailed procedure illustrates the preparation of reagents employed in preparing the compounds of this invention.

PREPARATION

*3 - bromotriphenylphosphonium bromide.*—Triphenylphosphine, 1.0 kg., and 770 g. of 1,3-dibromopropane are dissolved in 2.0 l. of xylene and the solution is stirred under a nitrogen atmosphere at 130° C. After 20 hours the mixture is cooled, and the crystalline product, which precipitates, is collected and washed with 2.0 l. of benzene. After drying in vacuo the product weighs 1578 g., M.P., 229–230; titration for bromide ion: Found, 17.1%; calcd., 17.2%.

The procedure is repeated substituting for 1,3-dibromopropane, a stoichiometrically-equivalent amount of 1,3-dibromo-2-methylpropane. There is obtained 3-bromo-2-methyltriphenylphosphonium bromide. The 2-ethyl, 2-propyl and 2-butyl analogs are obtained in the same manner.

The procedure is repeated, substituting for the triphenylphosphine stoichiometrically-equivalent amounts of tributyl phosphine, tri-n-hexyl-phosphine, tri-aminophenylphosphine and tribenzylphosphine; there are obtained, respectively, 3-bromopropyltributylphosphonium bromide, 3-bromopropyl-tri-n-hexylphosphonium bromide, 3-bromopropyltriaminophenylphosphonium bromide and 3-bromopropyltribenzylphosphonium bromide.

The procedure is repeated substituting for 1,3-dibromopropane, a stoichiometrically-equivalent amount of 1,3-dichloropropane; there is obtained 3-chloropropyltriphenylphosphonium chloride. In a similar manner, substituting 1,3-diiodopropane, there is obtained 3-iodopropyltriphenylphosphonium iodide.

The following examples are not limiting but are illustrative of the processes of this invention and of the compounds advantageously prepared thereby.

EXAMPLE I

*3-dimethylaminopropyltriphenylphosphonium bromide hydrobromide.*—A solution of 595 g. of anhydrous dimethylamine and 1358 g. of 3-bromopropyltriphenylphosphonium bromide in 4 liters of ethanol is warmed to 70° C. until solution is complete and the solution then is allowed to stand at room temperature for 20 hours. Volatile components are removed by distillation in a vacuum and the residue is suspended in 2.0 l. of ethanol and is redistilled to remove excess amine. The residue is dissolved in 3.0 l. of warm ethanol and gaseous hydrogen bromide is passed into the solution until the mixture was acidic. After filtration the solution is concentrated to a volume of 3.0 l., is cooled, whereupon the product precipitates, and the precipitate is collected; it weighs 1265 g., M.P. 274–281° C. Recrystallization from ethanol raises the melting point to 280.5–282.5° C. Bromide ion titration: Found, 31.2%; calcd., 31.3%.

EXAMPLE II

*3 - methylaminopropyltriphenylphosphonium bromide hydrobromide.*—3 - bromopropyltriphenylphosphonium bromide (25.0 g.), 13.2 g. methyl amine and 120 ml. methanol are mixed and reacted by the procedure of Example I. There is obtained 19.0 g. of product, M.P. 279–281° C. Bromide ion titration: Found, 32.3%; calcd., 32.4%.

EXAMPLE III

*3 - aminopropyltriphenylphosphonium bromide hydrobromide.*—3-bromopropyltriphenylphosphonium bromide (100 g.) and 21.0 g. anhydrous ammonia are dissolved in 500 ml. ethanol and the reaction is carried out according to the procedure of Example I. Recrystallization from ethanol removes a small amount of bis-alkylation by-product from the crude reaction residue and the desired mono adduct is recovered from the crystallization liquors, M.P. 260–262.5°. Bromide ion titration: Found, 32.6%; calcd., 33.2%.

EXAMPLE IV

*3-(1-piperazinopropyl)-triphenylphosphonium bromide hydrobromide.*—To a solution of piperazine hydrobromide (from 172 g. anhydrous piperazine, 2.5 l. of 80% ethanol and 227 ml. 48% hydrobromic acid) at 60° is added 464 g. of 3-bromopropyltriphenylphosphonium bromide in a single portion and the resulting mixture is heated at reflux for 5.5 hours. After evaporation of the volatile components in vacuo the residue is digested with 5 liters of ethanol at reflux and the insoluble piperazine dihydrobromide is removed by filtration. The alcohol filtrate is concentrated to 2.5 l., is cooled to 10° C. and the product which separated is isolated by filtration; it weighs 363 g., M.P. 278–283° C. An additional 108 g. is isolated by further concentration of the liquors.

EXAMPLE V

By the procedure of the designated examples, substituting appropriately substituted phosphonium halides and amines, the following additionally substituted 3-aminopropyltriphenylphosphonium bromide hydrobromides are prepared:

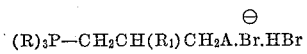

| Procedure of Example | R | $R_1$ | A |
|---|---|---|---|
| I | $C_6H_5$ | H | $-N(H)CH_2CH_2CH_3$ |
| I | $C_6H_5$ | H | $-N(CH_2CH_2CH_2CH_3)_2$ |
| I | $C_6H_5$ | $CH_2CH_2CH_2CH_3$ | $-N(CH_3)_2$ |
| IV | $C_6H_5$ | H | $-N-CH_2CH_2OCH_2CH_2-$ |
| IV | $C_6H_5$ | H | $-N-CH_2CH_2CH_2CH_2CH_2-$ |
| I | $CH_3CH_2CH_2CH_2$ | H | $-N(CH_3)_2$ |
| I | $CH_3(CH_2)_5-$ | H | $-N(CH_3)_2$ |
| I | $C_6H_5CH_2$ | H | $-N(CH_3)_2$ |
| I | $C_6H_5$ | H | $-N(CH_3)CH_2CH=CH_2$ |
| I | $C_6H_5$ | H | $-N(CH_3)\overline{CHCH_2CH_2}$ |
| III | $C_6H_5$ | $CH_3$ | $-NH_2$ |
| IV | $C_6H_5$ | H | $-NCH_2CH_2N(CH_2CH_2CH_3)CH_2CH_2-$ |
| IV | $C_6H_5$ | H | $-NCH_2CH_2N(CH_2CH_2OCH_2CH_3)CH_2CH_2-$ |
| IV | $C_6H_5$ | H | $-NCH_2CH_2N(CH_2CH_2OC_6H_5)CH_2CH_2-$ |
| IV | $C_6H_5$ | H | $-NCH_2CH_2N(CH_2CH_2OCH_2CH_2OH)CH_2CH_2-$ |
| IV | $C_6H_5$ | H | $-NCH_2CH_2N(SO_2CH_2CH_2CH_3)CH_2CH_2-$ |
| IV | $C_6H_5$ | H | $-NCH_2CH_2N[SO_2N(CH_2CH_3)_2]CH_2CH_2-$ |
| IV | $C_6H_5$ | H | $-NCH_2CH_2N(CH_2CH_2OCH_2CH_2OH)CH_2CH_2-$ |
| IV | $C_6H_5$ | H | $-NCH_2CH_2N(CH_2CH_2CH_2CH_3)CH_2CH_2-$ |

When the bromo-tri-substituted phosphonium bromide starting material is used, the above compounds are obtained as bromide hydrobromides. Similarly, use of the chloro-tri-substituted phosphonium chloride and iodo-tri-substituted phosphonium iodide leads, respectively, to chloro hydrochlorides and iodo hydroiodides.

EXAMPLE VI

The preparation of the aminopropylidene tri-substituted-phosphorane compounds of the instant invention is carried out by the following procedure: Anhydrous 3-dimethylaminopropyltriphenylphosphonium bromide hydrobromide prepared as described in Example I, 1530 g., is suspended in 4.5 l. of dry tetrahydrofuran and 6.0 moles of butyl lithium in heptane solution is added during one hour. There is generated, in situ, 3-dimethylaminopropylidene triphenylphosphorane, which is suitable for reaction with an appropriately-substituted ketone to prepare the aminopropylidene compounds with valuable psychotherapeutic properties as taught in said copending applications and said patents. In a similar manner, there are prepared the following aminopropylidene tri-substituted phosphorane compounds:

in Example I, 1530 g., is suspended in 4.5 l. dry tetrahydrofuran and 6.0 moles of butyl lithium in heptane is added during 1 hour. After an additional 30 minutes, 483 g. of 6,11-dihydrodibenz(b,e)oxepin-11-one, prepared as described in copending patent application Ser. No. 245,643, is added to the deep red solution and the reaction was maintained at reflux for 10 hours. Water, 500 ml., is added at room temperature and the solvent is removed in vacuo. The crude residue is treated with 10% hydrochloric acid until acidic (pH 2) and then 1.5 l. benzene is added. After stirring, the mixture separates into three phases (an insoluble hydrochloride salt product phase, an aqueous phase and an organic phase). The benzene layer is removed by decantation and the remaining mixture is rendered basic with 10% sodium hydroxide solution and is extracted with 3 1500 ml. portions of benzene. The benzene extracts are washed, then dried with anhydrous sodium sulfate and concentrated in a vacuum leaving a residue of 1530 g. Gas and thin-layer chromatography analysis show this to be a cis/trans mixture (approx. 4:1) of 11-dimethylaminopropylidene-6,11-dihydrodibenz[b,e]oxepin (90% yield). This mixture has substantially more activity pharmacologically than the cis/trans mixture obtained by the Grignard route disclosed in the said copending application.

| R | $R_1$ | A |
|---|---|---|
| $C_6H_5$ | H | $-NH(CH_3)$ |
| $C_6H_5$ | H | $-NH_2$ |
| $C_6H_5$ | H | $-NCH_2CH_2NHCH_2CH_2-$ |
| $C_6H_5$ | H | $-N(H)CH_2CH_2CH_2CH_3$ |
| $C_6H_5$ | H | $-N(CH_2CH_2CH_2CH_3)_2$ |
| $C_6H_5$ | $CH_2CH_2CH_2CH_3$ | $-N(CH_3)_2$ |
| $C_6H_5$ | H | $-NCH_2CH_2OCH_2CH_2-$ |
| $C_6H_5$ | H | $-NCH_2CH_2CH_2CH_2CH_2-$ |
| $CH_3CH_2CH_2CH_2$ | H | $-N(CH_3)_2$ |
| $CH_3(CH_2)_5$ | H | $-N(CH_3)_2$ |
| $C_6H_5CH_2$ | H | $-N(CH_3)_2$ |
| $C_6H_5$ | H | $-N(CH_3)CH_2CH=CH_2$ |
| $C_6H_5$ | H | $-N(CH_3)\overline{CHCH_2CH_2}$ |
| $C_6H_5$ | $CH_3$ | $-NH_2$ |
| $C_6H_5$ | H | $-NCH_2CH_2N(CH_2CH_2CH_3)CH_2CH_2-$ |
| $C_6H_5$ | H | $-NCH_2CH_2N(CH_2CH_2OCH_2CH_3)CH_2CH_2-$ |
| $C_6H_5$ | H | $-NCH_2CH_2N(CH_2CH_2OC_6H_5)CH_2CH_2-$ |
| $C_6H_5$ | H | $-NCH_2CH_2N(CH_2CH_2OCH_2CH_2OH)CH_2CH_2-$ |
| $C_6H_5$ | H | $-NCH_2CH_2N(SO_2CH_2CH_2CH_3)CH_2CH_2-$ |
| $C_6H_5$ | H | $-NCH_2CH_2N[SO_2N(CH_2CH_3)_2]CH_2CH_2-$ |
| $C_6H_5$ | H | $-NCH_2CH_2N(CH_2CH_2OCH_2CH_2OH)CH_2CH_2-$ |
| $C_6H_5$ | H | $-NCH_2CH_2N(CH_2CH_2CH_2CH_3)CH_2CH_2-$ |

EXAMPLE VII

*11-(3-dimethylaminopropylidene)-6,11-dihydrodibenz(b,e)oxepine.*—Anhydrous 3-dimethylaminopropyltriphenylphosphonium bromide hydrobromide prepared as

EXAMPLE VIII

*11-(3-dimethylaminopropylidene)-2-chloro-6,11-dihydrodibenz-(b,e)-oxepin.*—By the procedure of Example VII, 43.6 g. of dimethylaminopropyltriphenylphosphonium bromide hydrobromide, 176 ml. of tetrahydrofuran, 0.172 mole of butyl lithium and 17.2 g. of ketone leads to 22.0 g. of product. One of the isomers is isolated by crystallization of the hydrochloride salt from chloroform-carbon tetrachloride, M.P. 228–230° C.

*Analysis.*—Calcd. for $C_{19}H_{21}ONCl_2$: C, 65.14; H, 6.04; N, 4.00. Found: C, 64.84; H, 5.95; N, 3.91.

EXAMPLE IX

*11-(3 - dimethylaminopropylidene)-9-chloro-6,11-dihydrodibenz - (b,e) - oxepin.*—3-dimethylaminopropyltriphenphosphonium bromide hydrobromide, 2.60 g., 1.0 g. of ketone, 10 ml. of dry tetrahydrofuran and 0.0102 mole of butyl lithium reacted by the procedure of Example VII leads to 1.28 g. crude product as a mixture of geometric isomers. One of the pure isomers, 450 mg., M.P. 220–222° C., is isolated by fractional crystallization of the hydrochloride salt from ethanol-ether.

EXAMPLE X

*11-(3 - dimethylaminopropylidene)-2-dimethylsulfamyl-6,11-dihydrodibenz-(b,e)-oxepin.*—3 - dimethylaminopropyltriphenylphosphonium bromide hydrobromide, 24.5 g., 100 ml. of dry tetrahydrofuran, 0.096 mole butyl lithium and 12.0 g. ketone reacted by the procedure of Example VII leads to 15.6 g. product as a cis/trans mixture. Crystallization of the hydrochloride salts from ethanol affords 6.8 g. of one isomer, M.P. 225–227° C. and 1.0 g. of the other isomer, M.P. 214–217°.

*Analysis.*—Calcd. for $C_{21}H_{27}O_3N_2SCl$: C, 59.63; H, 6.43. Found (first isomer): C, 59.54; H, 6.44. Found (second isomer): C, 59.62; H, 6.42.

EXAMPLE XI

*10-(3-dimethylaminopropylidene)thioxanthene.*—3 - dimethylaminopropyltriphenylphosphonium bromide hydrobromide, 7.64 g., 50 ml. of dry THF, 0.030 mole of butyl lithium and 2.12 g. of thioxanthenone by the procedure of Example VII and a reaction period of 4 hours leads to 1.6 g. of product as the hydrochloride, M.P. 180–183°. This material is physically identical with the same product prepared by the Grignard reaction.

EXAMPLE XII

*10-(3-dimethylaminopropylidene)-2-chlorothioxanthene.*—The procedure of Example VII with 2.47 g. of 2-chlorothiaxanthen-10-one leads to cis/trans mixture of product as the hydrochloride, M.P. 187–191°.

EXAMPLE XIII

*Reaction of 3-amino- and 3-methylaminopropyltriphenylphosphonium bromide hydrobromide with 6,11-dihydrodibenz - (b,e) - oxepin-11-one.*—3-methylaminopropyltriphenylphosphonium bromide hydrobromide, 6.0 g., suspended in 50 ml. of dry tetrahydrofuran is treated with 0.024 mole of butyl lithium and then 1.88 g. ketone as in Example VII. The basic product, as a mixture of geometric isomers, weighs 2.1 g.; from this mixture one pure isomer, 990 mg., M.P. 223–225°, is isolated by recrystallization with ethanol-ether. The procedure is repeated substituting a stoichiometrically-equivalent amount of 3-aminopropyltriphenylphosphonium bromide hydrobromide; there is obtained 11-(3-aminopropylidene)-6,11-dihydrodibenz-(b,e) oxepin.

EXAMPLE XIV

*11-(3 - piperazinopropylidene)-2-chloro-6,11-dihydrodibenz-(b,e)-oxepin.*—To a suspension of 71.5 g. of the phosphonium salt of Example VII in 220 ml. of dry tetrahydrofuran is added 120 ml. of 2.62 M butyl lithium in heptane during one hour followed in 30 minutes by 25.0 g. ketone. After 15.5 hours at reflux the basic reaction product is isolated in the manner described in Example VII; 33.8 g. viscose oil. A crystalline dihydrochloride of this material, 2-chloro-11[3-piperazinopropylidene]-6H-dibenz[b,e]oxepin, prepared in methanol-ether, melted at 189–193° C. and was found to be a mixture of cis/trans isomers.

EXAMPLE XVI

By the procedure of Example VIII, substituting for the 6H-dibenz[b,e]oxepin-11-one, stoichiometrically-equivalent amounts of other appropriately substituted ketones, there are obtained the following additional aminopropylidene compounds:

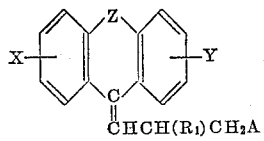

| Z | X | Y | $R_1$ | A |
|---|---|---|---|---|
| —O— | H | H | H | —N(CH$_3$)$_2$ |
| —S— | H | H | H | —NHCH$_3$ |
| —CH$_2$CH$_2$— | H | H | H | —N(CH$_3$)$_2$ |
| —CH=CH— | H | H | H | —N(CH$_3$)$_2$ |
| —CH$_2$S— | H | H | H | —N(CH$_3$)$_2$ |
| —NH— | H | H | H | —N(CH$_3$)$_2$ |
| —N(CH$_3$)CH$_2$— | H | H | H | —N(CH$_3$)$_2$ |
| —CH$_2$O— | H | H | CH$_3$ | —N(CH$_3$)$_2$ |
| —S— | 9-Cl | H | H | —N(CH$_3$)$_2$ |
| —S— | H | 2-Br | H | —N(CH$_3$)$_2$ |
| —CH$_2$O— | H | H | H | —NH(CH$_3$) |
| —CH$_2$O— | H | H | H | —NH$_2$ |
| —CH$_2$O— | H | H | H | —N(H)CH$_2$CH$_2$CH$_2$CH$_3$ |
| —CH$_2$O— | H | H | H | —N(CH$_2$CH$_2$CH$_2$CH$_3$)$_2$ |
| —CH$_2$O— | H | H | CH$_2$CH$_2$CH$_2$CH$_3$ | —N(CH$_3$)$_2$ |
| —CH$_2$O— | H | H | H | —N(CH$_3$)CH$_2$CH=CH$_2$ |
| —CH$_2$O— | H | H | H | —N(CH$_3$)$\overline{\text{CHCH}_2\text{C}}$H$_2$ |
| —CH$_2$O— | H | H | CH$_3$ | —NH$_2$ |
| —CH$_2$O | H | H | H | —NCH$_2$CH$_2$N(CH$_2$CH$_2$CH$_3$)CH$_2$CH$_2$— |
| —CH$_2$O— | 9-OH | H | H | —NCH$_2$CH$_2$OCH$_2$CH$_2$— |
| —CH$_2$O— | H | 2-Br | H | —NCH$_2$CH$_2$N(CH$_3$)CH$_2$CH$_2$— |
| —CH$_2$O— | 9-Cl | H | H | —NCH$_2$CH$_2$N(CH$_3$)CH$_2$CH$_2$— |
| —CH$_2$O— | H | 2-Cl | CH$_3$ | —NCH$_2$CH$_2$N(CH$_2$CH$_2$OCH$_2$CH$_3$)CH$_2$CH$_2$— |
| —CH$_2$O— | 7-CH$_2$CH$_2$CH$_2$CH$_2$CH$_3$ | H | H | —NCH$_2$CH$_2$N(CH$_2$CH$_2$OC$_6$H$_5$)CH$_2$CH$_2$— |
| —CH$_2$O— | 7-CH$_3$ | 2-I | H | —NCH$_2$CH$_2$N(CH$_2$CH$_2$OCH$_2$CH$_2$OH)CH$_2$CH$_2$— |
| —CH$_2$O | 8-CH$_3$CH$_2$CH$_2$ | H | H | —NCH$_2$CH$_2$NHCH$_2$— |
| —CH=CH— | H | 2-CF$_3$ | H | —NCH$_2$CH$_2$N(CH$_3$)CH$_2$CH$_2$— |
| —CH$_2$S— | 8-CH$_3$CH$_2$CH$_2$S | 2-CH$_3$CH$_2$CH$_2$CH$_2$O— | H | —NCH$_2$CH$_2$N(CH$_3$)CH$_2$CH$_2$— |
| —NH— | H | 2-Cl | H | —NCH$_2$CH$_2$CH$_2$CH$_2$— |
| —CH$_2$O— | H | H | H | —NCH$_2$CH$_2$N(CH$_3$)CH$_2$CH$_2$— |
| —CH$_2$O— | H | H | H | —NCH$_2$CH$_2$N(SO$_2$CH$_2$CH$_2$CH$_3$)CH$_2$CH$_2$— |
| —CH$_2$O— | H | H | H | —NCH$_2$CH$_2$N[SO$_2$N(CH$_2$CH$_3$)$_2$]CH$_2$CH$_2$— |
| —CH$_2$O— | H | H | H | —NCH$_2$CH$_2$N(CH$_2$CH$_2$OCH$_2$CH$_2$OH)CH$_2$CH$_2$— |
| —CH$_2$O— | H | H | H | —NCH$_2$CH$_2$N(CH$_2$CH$_2$CH$_2$CH$_3$)CH$_2$CH$_2$— |

EXAMPLE XVII

By the procedure of Example VIII substituting stoichiometrically-equivalent amounts of the appropriate ketones the following additional aminopropylidene compounds are prepared:

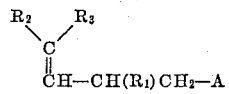

| R₂ | R₃ | R₁ | A |
|---|---|---|---|
| CH₃ | CH₃ | H | —NH₂ |
| CH₃ | CH₃ | H | —N(H)CH₃ |
| CH₃ | CH₃ | H | —N(CH₃)₂ |
| —CH₂CH₂— | | H | —N(CH₃)₂ |
| —CH₂CH₂CH₂— | | H | —N(CH₃)₂ |
| —CH₂CH₂CH₂CH₂— | | H | —N(CH₃)₂ |
| —CH₂CH₂CH₂CH₂CH₂— | | H | —N(CH₃)₂ |
| —CH₂CH₂CH₂CH₂CH₂CH₂— | | H | —N(CH₃)₂ |
| —CH₂CH₂CH₂CH₃ | | H | —N(CH₃)₂ |
| CH₃ | —CH₂CH₂CH₂CH₃ | CH₂CH₂CH₂CH₃ | —NCH₂CH₂NHCH₂CH₂— |
| CH₃ | CH₃ | H | —NCH₂CH₂N(CH₂CH₂CH₂CH₃)CH₂CH₂— |

EXAMPLE XVIII

The procedure of Example VII is repeated substituting, respectively, for n-butyl lithium other strong bases: sodium hydride, sodium methoxide and potassium-tert.-butoxide. The desired aminopropylidene dibenzoxepine is obtained.

The procedure of Example VI is repeated substituting for the dry tetrahydrofuran, respectively, the same weight of dry diethylether, dry dimethoxy ethane and dry dimethylsulfoxide. There are obtained the desired aminopropylidene tri-substituted-phosphorane compounds.

EXAMPLE XIX

In an atmosphere of dry nitrogen, 3060.0 g., 6.0 moles, of 3-dimethylaminopropyltriphenyl phosphonium bromide hydrobromide is slurried in 9.0 l. of dry tetrahydrofuran. The slurry is stirred at 25° C. as 5.5 l. of a 2.18 M butyl lithium in hexane solution (12.0 moles of BuLi) is added over a 90 minute period. During the addition the solid material gradually dissolves and the temperature rises spontaneously to gentle reflux. The resulting red solution is allowed to stir an additional 30 minutes during which time most of the residual solid material dissolves.

The solution is cooled to 25° C. and 966 g., 4.6 moles, of 6,11-dihydrodibenz (b,e) oxepin-11-one is added all at once. The dark solution is heated slowly to reflux and is stirred at 57° C. for 10 hours. The mixture is cooled to 25° C. and 1 l. of water is added from a dropping funnel in a slow steady stream. The organic solvents are removed in vacuo leaving a thick aqueous slurry that is adjusted to pH 2 by the addition of 2.4 l. of 10% hydrochloric acid. The aqueous mixture is stirred at 3.0 l. of benzene is added affording a three layered system (benzene, water, product). The product and aqueous layers are separated and washed twice with 3.0 l. portions of benzene. The two lower phases are treated with 10% sodium hydroxide until the pH reaches 9–10. The oily product which separates is extracted with 3–3 l. portions of benzene and the extracts are washed once with water and then with saturated sodium chloride solution. The benzene layer is dried over anhydrous sodium sulfate, then is decolorized with charcoal. Evaporation of the solvent leaves a residue comprising an admixture of cis and trans isomers of 11-(3-dimethylaminopropylidene)-6,11-dihydrodibenz (b,e)oxepin.

Pure cis isomer is recovered from the admixture by dissolving the admixture in 7 l. of chloroform, acidifying with a slight excess of anhydrous hydrogen chloride and diluting the solution with 7 l. of carbon tetrachloride. The solution is stirred in an ice bath whereupon crystalline material starts slowly to separate. The slurry is chilled to 3° C. and filtered. The filter cake is washed with carbon tetrachloride, then with ether. Air drying yields 895 g. of product, M.P., 202–205° C. The product is recrystallized three times from 12 liters of 50% chloroform-carbon tetrachloride and the melting point rises to 211.5–212.0° C. There is obtained 660.0 g., 45% of theory, of pure cis isomer, containing only trace amounts of chloroform after drying in a vacuum oven. Paper and thin layer chromatography confirm freedom from the presence of trans isomer.

EXAMPLE XX

The predominant cis isomer is recovered from the acidified chloroform solution of the admixture prepared as in Example XIX by carefully concentrating the chloroform solution until the solute of lower solubility crystallizes, instead of by adding carbon tetrachloride: 500 g. of mixture is dissolved in 3500 ml. of chloroform and the solution is concentrated at 40° C. and 20 mm. pressure until crystals begin to separate. The mixture is cooled to 3° C. and kept overnight then is filtered. There is obtained predominantly cis isomer.

Acidified chloroform solution, 1000 ml., containing 500 g. of the admixed cis and trans isomers prepared by the procedure of Example XVII is cooled step-by-step, to 0° C., −10° C. and −20° C., and after allowing completion of crystallization at each step, each crop of solute of lesser solubility is removed. No carbon tetrachloride is added in this procedure; the first crops obtained are predominantly cis isomer.

EXAMPLE XXI

The procedure of Example XIX is repeated, using a slight excess of the following acids in place of hydrogen chloride to acidify the chloroform solution of admixed cis and trans isomers: hydrogen bromide, hydrogen iodide, sulfuric, phosphoric, citric, acetic, lactic, maleic and formic. Substantially the same results are obtained.

What is claimed is:

1. A compound selected from the group consisting of those of the formula:

$$(R)_3P=CH-CH(R_1)CH_2A$$

wherein:

R is selected from the group consisting of alkyl of up to 6 carbon atoms, phenyl, aminophenyl and benzyl;

$R_1$ is selected from the group consisting of hydrogen and alkyl of up to 4 carbon atoms;

A is selected from the group consisting of amino, monoalkylamino, dialkylamino, piperidino, morpholino, piperazinyl, 4-alkylpiperazinyl, 4-hydroxyalkylpiperazinyl, 4-alkoxyalkylpiperazinyl, 4-aryloxyalkylpiperazinyl, 4-hydroxyalkyloxyalkylpiperazinyl, 4-alkylsulfonylpiperazinyl, 4-dialkylsulfamylpiperazinyl, mono-lower alkenylamino, mono-lower cycloalkylamino, said alkyl, said lower alkenyl and said cycloalkyl groups containing up to about 4 carbon atoms, said aryl groups containing up to about 6 carbon atoms.

2. A compound selected from the group consisting of those of the formula:

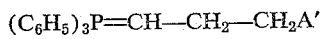

wherein A′ is selected from the group consisting of amino, monoalkylamino, dialkylamino, piperidino, morpholino, piperazinyl and 4-alkylpiperazinyl, said alkyl groups containing up to about 4 carbon atoms.

3. (3 - dimethylaminopropylidene-1)triphenylphosphorane.

4. [3 - (1-piperazino)propylidene-1]triphenylphosphorane.

References Cited
UNITED STATES PATENTS

| | | | |
|---|---|---|---|
| 3,168,523 | 2/1965 | Cusic et al. | 260—268 |
| 3,200,120 | 8/1965 | Lovell | 260—268 |
| 3,152,145 | 10/1964 | Sulkowski et al. | 260—333 |
| 3,209,013 | 9/1965 | Hechenbleikner et al. | 260—333 |
| 3,149,103 | 9/1964 | Peterson et al. | 260—240 |
| 3,189,657 | 6/1965 | Mills | 260—649 |
| 3,192,205 | 6/1965 | Depoorter et al. | 260—240 |
| 3,253,033 | 5/1966 | Maier | 260—570.5 |

OTHER REFERENCES

Campbell et al.: J. Org. Chem., vol. 24, p. 1246 to 1251 (1959).

Wittig et al.: Annalen der chemie, vol. 619, p. 10 to 15 and 18–19 (1958).

JOHN D. RANDOLPH, *Primary Examiner.*

HENRY R. JILES, *Examiner.*

J. W. ADAMS, *Assistant Examiner.*